United States Patent [19]

Lange et al.

[11] Patent Number: 5,175,932
[45] Date of Patent: Jan. 5, 1993

[54] PORTABLE HANDHELD TOOL HAVING A DRIVE SHAFT ROTATABLY JOURNALLED IN A PROTECTIVE TUBE

[75] Inventors: Karl-Heinz Lange, Remshalden; Helmut Schlessmann, Waiblingen; Hans Trumpf, Winnenden, all of Fed. Rep. of Germany

[73] Assignee: Andreas Stihl, Waiblingen, Fed. Rep. of Germany

[21] Appl. No.: 796,649

[22] Filed: Nov. 22, 1991

[30] Foreign Application Priority Data

Nov. 29, 1990 [DE] Fed. Rep. of Germany ... 9016233[U]

[51] Int. Cl.⁵ .............................................. B26B 7/00
[52] U.S. Cl. ..................................... 30/276; 30/296.1
[58] Field of Search ................. 30/276, 347, 296.1; 464/52, 173, 180, 160, 87; 192/106.1, 30 V

[56] References Cited

U.S. PATENT DOCUMENTS

| | | | |
|---|---|---|---|
| 3,430,343 | 3/1969 | Ishizaki et al. | 30/276 |
| 3,977,078 | 8/1976 | Pittinger, Jr. | 30/276 |
| 4,226,021 | 10/1980 | Hoff | 30/276 |
| 4,236,310 | 12/1980 | Müller | 30/276 |
| 4,389,203 | 6/1983 | Düntzen | 464/87 |
| 4,551,115 | 11/1985 | Ferguson | 464/180 |
| 4,714,447 | 12/1987 | Hironaka | 464/180 |
| 4,817,738 | 4/1989 | Dorner et al. | 464/52 |
| 4,848,846 | 7/1989 | Yamada et al. | 30/347 |
| 4,953,294 | 9/1990 | Dohse | 30/276 |

Primary Examiner—Douglas D. Watts
Assistant Examiner—Hwei-Siu Payer
Attorney, Agent, or Firm—Walter Ottesen

[57] ABSTRACT

The invention is directed to a portable handheld tool such as a brushcutter which includes a work tool assembly and a drive motor connected by a drive shaft. The drive shaft is surrounded by a protective tube and is centrally held therein by means of a bearing sleeve unit. The bearing sleeve unit braces itself against the inner peripheral wall surface of the protective tube via outwardly extending support ribs. The bearing sleeve unit defines a bearing bore for holding and guiding the drive shaft within the protective tube. The bearing bore and the drive shaft conjointly define an annular bearing play gap therebetween whereby frictional heat generated in the bearing sleeve unit is reduced while vibrations of the drive shaft are developed and imparted to the bearing sleeve unit. The support ribs are configured so as to be resilient in the radial direction to attenuate the vibrations imparted to the bearing sleeve unit. A plurality of impact ribs extends substantially radially from the outer surface of the center portion for impacting against the inner wall surface in response to the vibrations thereby limiting the amplitude thereof.

13 Claims, 4 Drawing Sheets

PORTABLE HANDHELD TOOL HAVING A DRIVE SHAFT ROTATABLY JOURNALLED IN A PROTECTIVE TUBE

FIELD OF THE INVENTION

The invention is directed to a portable handheld tool such as a brushcutter. The portable handheld tool includes a protective tube having first and second ends. A motor is mounted on the first end and a work tool such as a cutterhead is mounted on the second end. The work tool is connected to the motor by a drive shaft which is rotatably journalled within the protective tube by at least one bearing sleeve unit.

BACKGROUND OF THE INVENTION

Brushcutters are known per se and include a protective tube which is either straight or bent. The cutterhead of the brushcutter is carried at one end of the tube and the drive member at the other end thereof. The drive shaft connects the motor to the cutterhead and is supported in the protective tube by at least one bearing sleeve unit. For this purpose, the bearing sleeve unit includes radial holding ribs which extend in the longitudinal direction of the protective tube.

No significant tolerance differences are permitted to occur when the bearing sleeve unit is built into the protective tube. If the bearing sleeve unit is undersized, then the support ribs do not lie radially against the protective tube so that an adequate support of the drive shaft within the protective tube is hardly provided. If the bearing sleeve unit is oversized, then inwardly directed forces acting radially on the support ribs can occur when building the bearing sleeve unit into the protective tube. These forces can deform the bearing sleeve unit and considerably limit its bearing characteristics. Especially in the case of bent protective tubes, an increased radial force can be applied to the bearing sleeve unit because an oval cross section is imparted to the protective tube in the bent region thereby causing the bearing sleeve unit to become deformed thereby causing its bearing characteristic to deteriorate. The drive shaft rotates in the bearing sleeve unit at a rotational speed of 7,000 rpm and more and generates a considerable friction heat whereby damaging excessive temperatures can develop in the bearing sleeve unit especially in the deformed region of the protective tube.

SUMMARY OF THE INVENTION

It is an object of the invention to provide a portable handheld tool wherein the drive shaft is rotatably journalled in the protective tube by a bearing sleeve unit in such a manner that a support of the drive shaft within the tube attenuates vibrations and compensates for tolerances while reliably preventing the bearing sleeve unit from becoming damaged by heating.

The invention is directed to a portable handheld tool such as a brushcutter driven by a motor. The portable handheld tool includes: a housing for accommodating the motor therein; a protective tube which can be subjected to vibrations during operational use of the tool, the protective tube having a rearward end connected to the housing of the motor and having a forward end, the tube also having an inner wall surface; a work tool assembly mounted on the forward end; a drive shaft mounted in the protective tube for connecting the motor to the work tool assembly; a bearing sleeve unit arranged in the protective tube and including an annular-like center portion defining a bearing bore for holding and guiding the drive shaft within the protective tube; the bearing bore and the drive shaft conjointly defining an annular bearing play gap (LS) therebetween whereby frictional heat generated in the bearing sleeve unit is reduced while vibrations of the drive shaft are developed and imparted to the bearing sleeve unit; the center portion having an outer surface in spaced relationship to the inner wall surface of the protective tube; the bearing sleeve unit further including a plurality of support ribs extending outwardly from the outer surface to brace the bearing sleeve unit against the inner wall surface for supporting the bearing sleeve unit within the protective tube; the support ribs being configured to be resilient in a direction extending radially outwardly from the annular-like center portion thereby attenuating the vibrations and effectively isolating the protective tube therefrom; a plurality of impact ribs extending substantially radially from the outer surface of the center portion for impacting against the inner wall surface in response to the vibrations thereby limiting the amplitude of the vibrations; and, the impact ribs being distributed about the periphery of the outer surface and having respective outer ends spaced a radial distance (s) from the inner wall surface whereby the impact ribs impact against the inner wall surface after the bearing sleeve unit has moved with the impact ribs through the radial distance (s) in response to the vibrations.

A large bearing play is provided between the drive shaft and the bearing sleeve unit which defines a gap which, in turn, prevents the excessive generation of frictional heat. Even at high rotational speeds, no excessive temperatures of the bearing sleeve unit could be determined in practice.

The vibrations of the drive shaft which are possible because of the large bearing gap are attenuated via the resiliently configured support ribs of the bearing sleeve unit so that the protective tube and therefore the handheld portable tool per se remain substantially free of disturbing vibrations.

Impact ribs are mounted next to the support ribs and are distributed over the periphery of the bearing sleeve unit to limit possible vibration amplitudes. The impact ribs lie so as to be radially spaced with respect to the inner wall surface of the protective tube. The radial spacing of the impact ribs to the inner wall surface of the protective tube corresponds to the permissible maximum vibration amplitude and can be constructively determined.

In a preferred embodiment of the invention, an elastic intermediate member is provided for connecting the drive shaft to the clutch drum of a clutch driven by the drive motor. This elastic intermediate member decouples vibration of the drive shaft from the drive motor. The end of the drive shaft is advantageously configured to define the insert portion of a positive-engaging coupling which lies with radial play in a receptacle of the clutch drum with the intermediate space being filled out by an elastic insert defining the intermediate element. In this way, the vibrations, which are possible because of the journalling of the drive shaft in the bearing sleeve unit, are not transmitted to the clutch or the drive motor and therefore cannot produce disturbances there.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
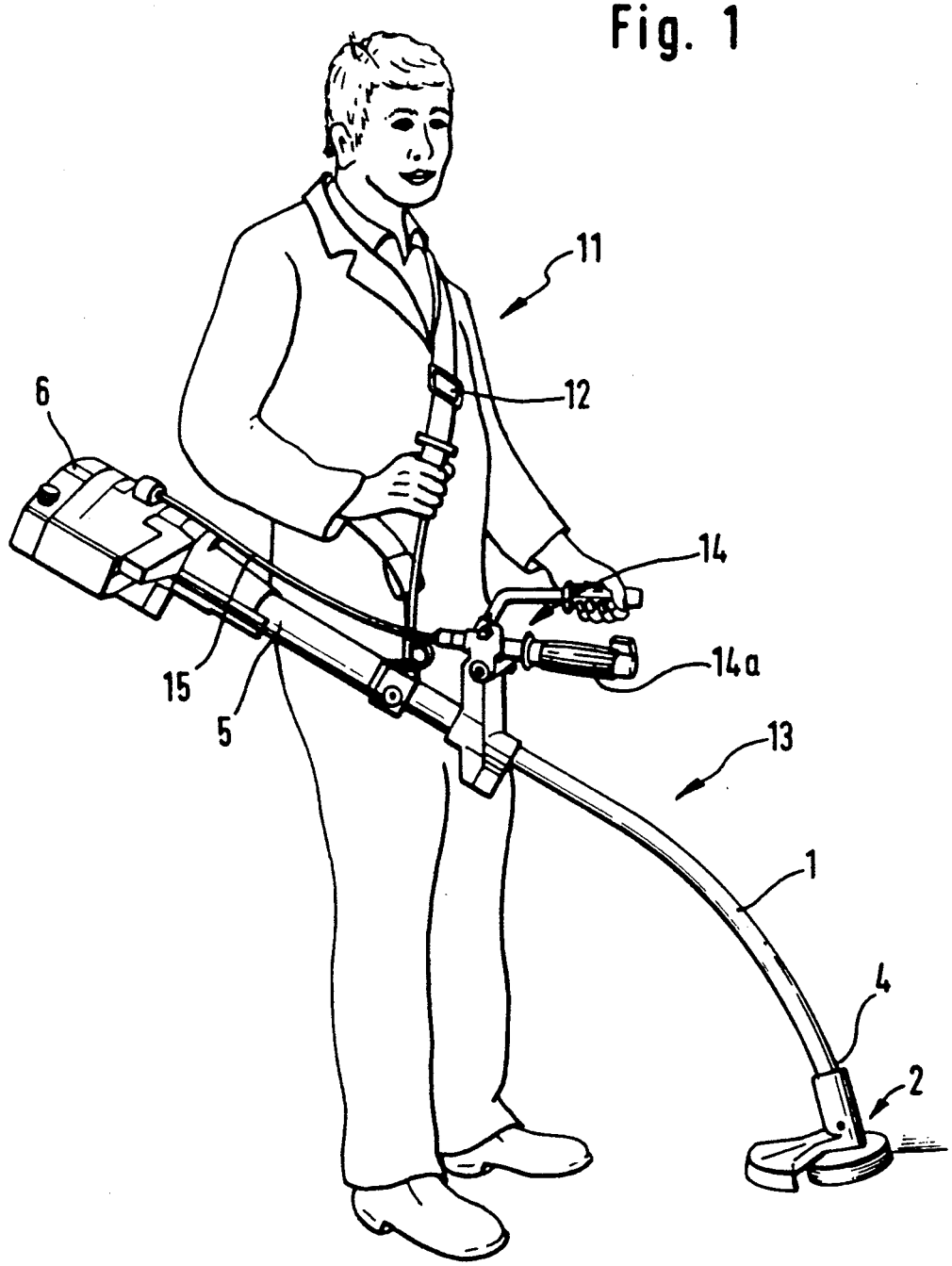
FIG. 1 is a perspective view of a brushcutter held in its operating position with the brushcutter being equipped with a bent protective tube.

The operator 11 shown in FIG. 1 wears over one shoulder a carrier belt 12 on which the brushcutter 13 is supported. The brushcutter essentially comprises a protective tube 1 having a forward end 4 on which a rotating cutterhead 2 is mounted. The cutterhead 2 is driven by a motor 6 attached to the rearward end 5 of the protective tube 1. The carrier belt 12 supports the brushcutter 13 at approximately the center of gravity thereof. A handlebar 14 is attached to the protective tube 1 between the attachment of the carrier belt 12 and the cutterhead 2. The operator guides the brushcutter 13 with the handlebar 14. The motor 6 of the brushcutter is configured as a gasoline engine and the throttle control line 15 is operated at the right handle grip 14a by rotating the handle grip.

Figure 2:
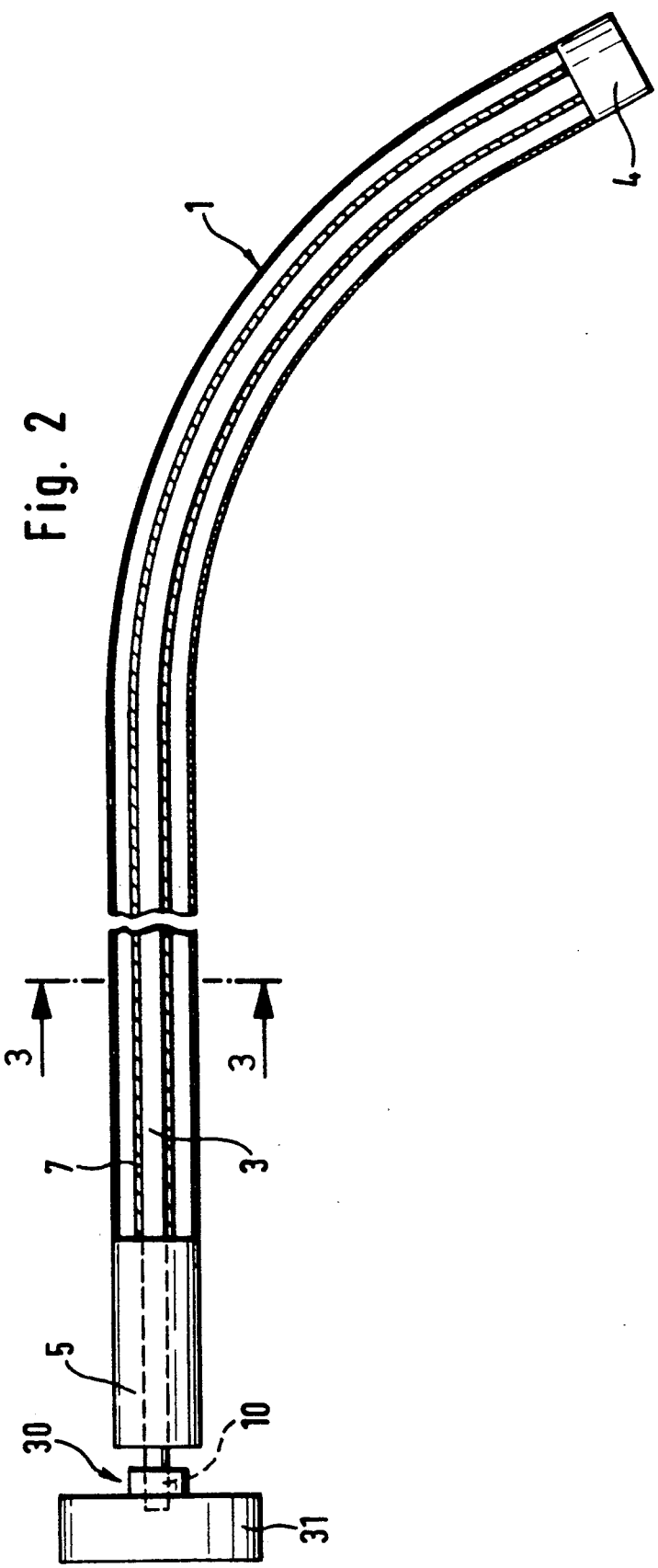
FIG. 2 is a side elevation view, partially in section, of the protective tube of the brushcutter shown in FIG. 1.

The protective tube 1 is shown in axial section in FIG. 2. At the rearward end 5, the drive shaft 3 is connected via a positive-engaging coupling 30 to a clutch drum 31 of a clutch driven by the motor 6. The positive-engaging coupling 30 connects the drive shaft 3 to the clutch drum 31 so that the drive shaft 3 rotates with the clutch drum. A connecting arrangement (not shown) for the cutterhead 2 is provided at the forward end 4. The drive shaft 3 is preferably flexible and is mounted in the bent protective tube 1. A bearing sleeve unit 7 holds the drive shaft 3 in an essentially central position within the protective tube 1. In the embodiment shown, the bearing sleeve unit extends over the entire length of the protective tube 1. The bearing sleeve unit 7 is configured as a single piece over the length of the protective tube 1. However, it can be advantageous to provide a plurality of short bearing sleeve units and to distribute them in spaced relation to each other over the length of the drive shaft 3 in lieu of a single bearing sleeve unit.

Figure 3:
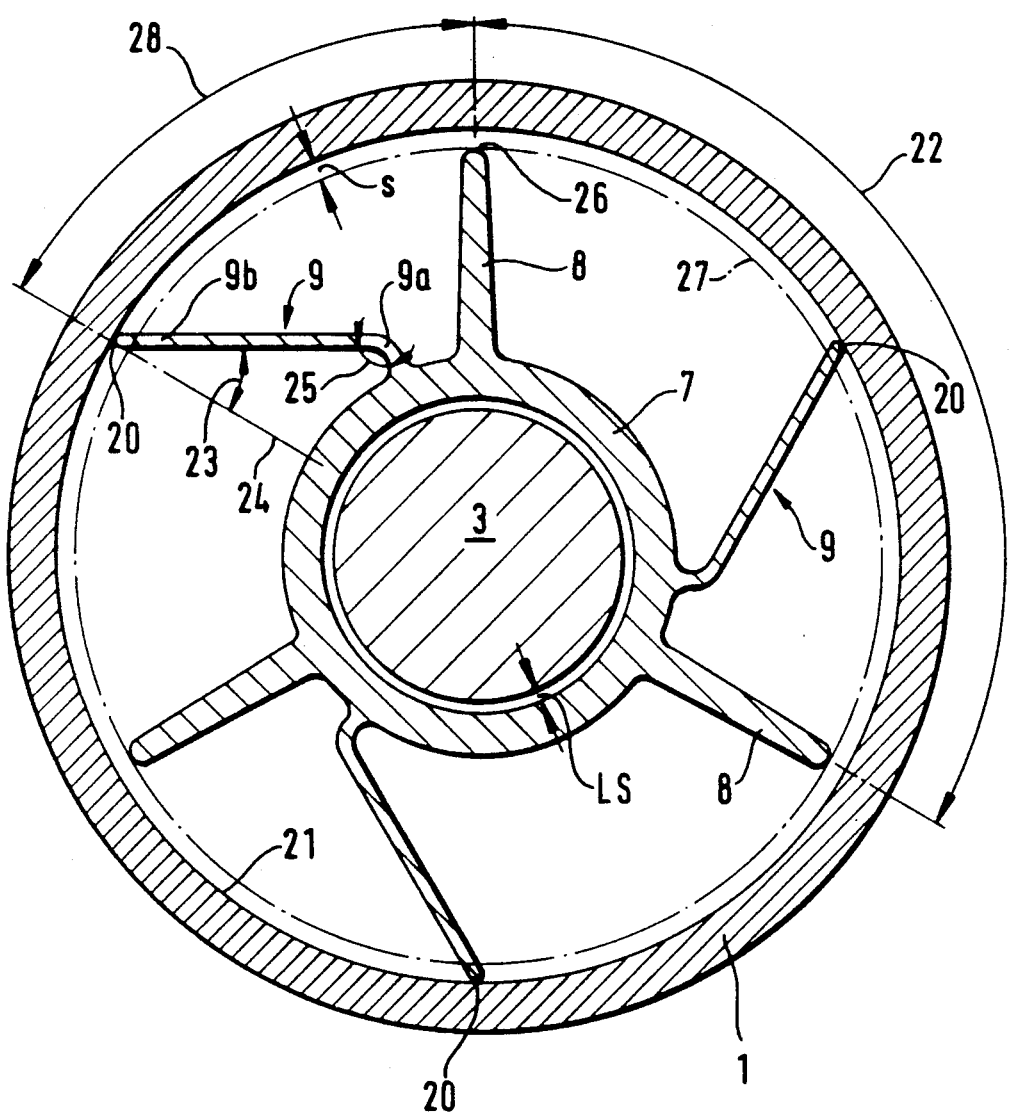
FIG. 3 is a section view taken along line 3—3 of FIG. 2.

The bearing sleeve unit 7 shown in section in FIG. 3 has support ribs 9 extending along the longitudinal length of the protective tube 1 and also extending starlike approximately radially outwardly as shown. The free ends 20 of the support ribs 9 are configured as head portions and are rounded and lie in contact engagement with the inner wall surface 21 of the protective tube 1. At least three support ribs 9 are necessary for centering the bearing sleeve unit 7 with the support ribs 9 being distributed uniformly in the peripheral direction of the unit 7 and arranged so that each two adjacent support ribs have a peripheral spacing 22 of 120° therebetween. Each of these support ribs 9 is configured so as to be resilient in the radial direction and comprises a first segment 9a extending radially from the bearing center portion. A second segment 9b extends from the first segment 9a and lies approximately tangential. The second segment 9b has a rounded head portion 20 which lies in contact engagement with the inner wall surface 21 of the protective tube 1.

In the embodiment shown, the first segment 9a and the second segment 9b conjointly define an angle 25 of approximately 130°. The second segment also lies at an angle 23 of approximately 30° to the radial 24.

The bearing sleeve unit 7 has impact ribs 8 in addition to the support ribs 9 which are elastically resilient in the radial direction. The impact ribs 8 extend precisely radially from the bearing sleeve unit 7 toward the inner wall surface 21 of the protective tube 1. The impact ribs 8 are configured so as to be stiff in the radial direction and have a greater thickness than the support ribs 9. The free ends 26 of the impact ribs 8 lie at a radial spacing (s) to the inner wall surface 21 of the protective tube 1.

In the embodiment shown, the same number of impact ribs 8 and support ribs 9 are provided with an impact rib 8 provided between each two support ribs 9. The ends 26 of the impact ribs 8 are preferably rounded and lie on a common circle 27 in the rest position of the bearing sleeve unit 7. The circle 27 lies at a radial spacing (s) to the inner wall surface 21 of the protective tube 1. The arrangement of the impact ribs 8 as well as the support ribs 9 over the periphery of the bearing sleeve unit 7 is so configured that the free ends 26 of the impact ribs 8 have a spacing from the free ends 20 of the support ribs 9 which corresponds to a peripheral angle 28 of 60°. The base points of the ribs 8 and 9 lie one next to the other at the center portion of the bearing sleeve unit 7 because of the tangential arrangement of the segment 9b of the support rib 9. Except for the bend between segments 9a and 9b, the ribs 8 and 9 extend essentially in a straight line and are preferably configured as a single piece with the bearing sleeve unit 7. The bearing sleeve unit 7 is made of a plastic resistant to heat.

As shown especially in FIG. 3, the drive shaft 3 lies with a large bearing play LS in the bearing sleeve unit 7. This affords the advantage that the drive shaft which rotates at a high rotational speed of approximately 7,000 rpm, can generate only a slight peripheral frictional heat in the bearing sleeve unit 7 so that temperature problems do not occur. The tendency of the drive shaft 3 and the bearing sleeve unit 7 to vibrate because of the large play LS is reduced because of the radially resilient support ribs 9 so that disturbing vibration is not transmitted to the protective tube 1. In order to limit possible vibration amplitudes, the impact ribs 8 are provided which brace the bearing sleeve unit 7 on the inner wall surface 21 of the protective tube 1 after the radial spacing (s) is overcome whereby large and possibly dangerous vibration amplitudes are reliably prevented.

In addition, a tolerance compensation during assembly of the bearing sleeve unit 7 in the protective tube 1 is made possible by the radially resilient support ribs 9. This tolerance compensation by the resilient support ribs 9 guarantees that the bearing sleeve unit surrounding the drive shaft 3 is essentially free of radial pressure forces so that the bearing sleeve unit 7 does not change its form especially also in the bent region of the protective tube 1. The radially resilient support ribs 9 thereby make possible a simpler assembly of the bearing sleeve unit 7 in the protective tube 1 which is independent of tolerance.

Because of the large bearing play LS of the drive shaft 3 within the bearing sleeve unit 7, the generation of large frictional heat is prevented on the one hand while, on the other hand, vibrations of the drive shaft 3 are permitted. The vibration occurring at the high rotational speeds of 7,000 rpm occur because of the large bearing play LS. In order to keep these vibrations away from the drive motor and according to a further embodiment of the invention, the drive shaft 3 is connected via an elastic intermediate element 32 to the clutch drum 31 of a clutch driven by the drive motor.

Figure 4:
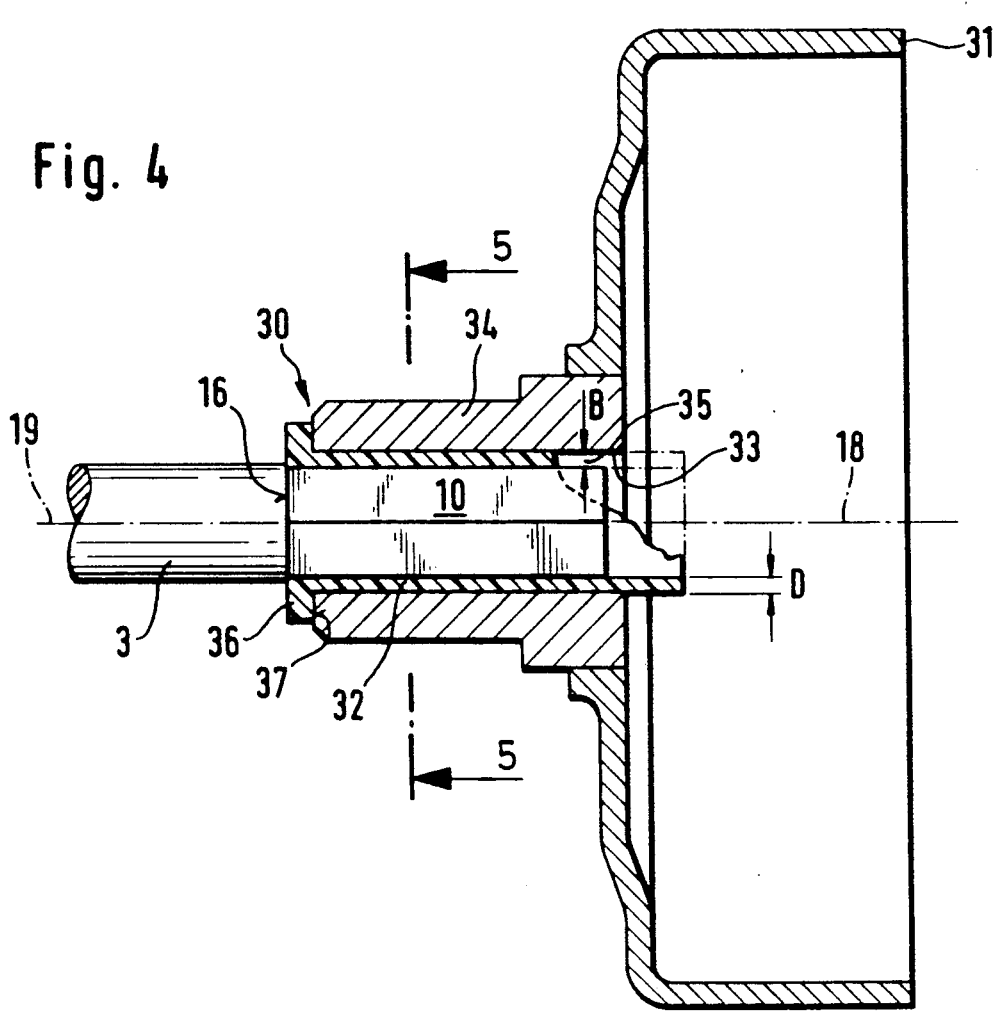
FIG. 4 is an axial section view taken through a clutch drum mounted at the motor end of the drive shaft.
Figure 5:
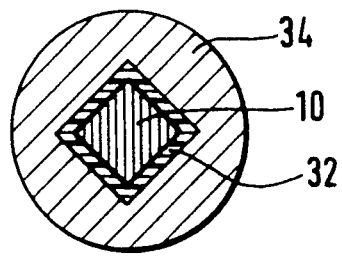
FIG. 5 is a section view taken along line 5—5 of FIG. 4.
Figure 6:
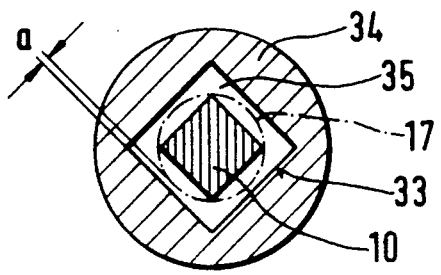
FIG. 6 is a section view corresponding to that of FIG. 5 but for another embodiment.

This connection is illustrated in FIG. 4 and is configured as a positive-engaging coupling 30. The drive shaft 3 is configured to have an insert portion 10 at its end facing toward the clutch drum 31. The insert portion 10 has a cross section which departs from the circular form as shown in FIGS. 5 and 6. The insert portion 10 is advantageously configured as an insert having four flats with the cross section having such dimensions that the cross section diagonal corresponds approximately to the diameter of the drive shaft 3. The shaft 3 then defines a shoulder 16 at the transition to the insert portion 10.

A receptacle 33 is provided for the insert portion 10 and is axially arranged in a shaft stub 34 connected to the clutch drum 31. In the embodiment shown, the rotational axis 18 of the clutch drum 31 and the longitudinal axis 19 of the insert portion 10 are coaxial. However, because of construction factors, a slight axial offset can exist between the axes 18 and 19.

The receptacle 33 has preferably a cross section adapted to the insert portion 10 with the cross section of the insert portion 10 having dimensions less than the dimensions of the receptacle 33. In this way, an intermediate space 35 is provided between the insert portion 10 and the wall of the receptacle 33 (FIG. 4). This intermediate space 35 is filled with an elastic insert 32 with the insert defining the intermediate element. The insert 32 is preferably made of plastic and especially of a polyurethane and has a wall thickness D which corresponds approximately to the width B of the intermediate space 5. It can be advantageous to configure to wall thickness D as being slightly greater than the width B.

In the embodiment shown, the insert 32 has a cross section corresponding to the receptacle 33 and to the insert portion 10 as can be seen especially in FIG. 5. The end of the plastic insert 32 facing toward the drive shaft 3 has a flange 36 projecting radially outwardly with the flange 36 being configured as a annular flange.

For assembling the positive-engaging coupling, the plastic insert 32 is pushed over the insert portion 10 or into the receptacle 33. Then, the insert portion is axially inserted into the receptacle 33 until the annular flange 36 lies clamped between the shoulder 16 of the drive shaft 3 and the end face 37 of the shaft stub 34 facing toward the shaft 3. In this position shown in FIG. 4, it is ensured that the axis 19 of the shaft 3 is axially coincident with the axis 18 of the clutch drum 31. A possible axial offset is compensated for by the arrangement of the plastic insert 32.

In a further embodiment of the invention shown in FIG. 6, the receptacle 33 and the insert portion 10 can be configured with the same cross section; however, the cross sectional dimensions of the insert portion 10 are to be so provided that the cross section lies within an imaginary circle 17. The circle 17 then has a diameter which is equal to or less than the diameter of the receptacle 33. The circle 17 preferably lies at a minimum spacing (a) with respect to the walls of the receptacle 33 with the axis of the receptacle 33 being perpendicular to the plane determined by the circle 17. The corner points of the quadratic cross section of the insert portion 10 then lie on the circle 17.

If the intermediate space 35 is filled with an elastic insert, then a connection is provided between the insert portion 10 and the shaft stub 34 or clutch drum 31 so that the insert portion 10 rotates with the shaft stub 34. The elastic insert 32 ensures that a good attenuation is provided between the drive shaft 3 and the clutch drum 31. If an overload occurs, then the elastic insert is deformed until it is destroyed and the insert portion 10 then freely rotates within the receptacle 33.

It is understood that the foregoing description is that of the preferred embodiments of the invention and that various changes and modifications may be made thereto without departing from the spirit and scope of the invention as defined in the appended claims.

What is claimed is:

1. A portable handheld tool such as a brushcutter driven by a motor, the portable handheld tool comprising:

a housing for accommodating the motor therein;

a protective tube which can be subjected to vibrations during operational use of the tool, the protective tube having a rearward end connected to said housing and having a forward end, said tube also having an inner wall surface;

a work tool assembly mounted on said forward end;

a drive shaft mounted in said protective tube for connecting said motor to said work tool assembly;

a bearing sleeve unit arranged in said protective tube and including an annular-like center portion defining a bearing bore for holding and guiding said drive shaft within said protective tube;

said bearing bore and said drive shaft conjointly defining an annular bearing play gap (LS) therebetween whereby frictional heat generated in said bearing sleeve unit is reduced while vibrations of the drive shaft are developed and imparted to the bearing sleeve unit;

said center portion having an outer surface in spaced relationship to said inner wall surface of said protective tube;

said bearing sleeve unit further including a plurality of support ribs extending outwardly from said outer surface to brace said bearing sleeve unit against said inner wall surface for supporting said bearing sleeve unit within said protective tube;

said support ribs being configured to be resilient in a direction extending radially outwardly from said annular-like center portion thereby attenuating said vibrations and effectively isolating said protective tube therefrom;

a plurality of impact ribs extending substantially radially from said outer surface of said center portion for impacting against said inner wall surface in response to said vibrations thereby limiting the amplitude of said vibrations; and, said impact ribs being distributed about the periphery of said outer surface and having respective outer ends spaced a predetermined radial distance from said inner wall surface whereby the impact ribs impact against said inner wall surface after said bearing sleeve unit has moved with said impact ribs through said predetermined radial distance in response to said vibrations.

2. The portable handheld tool of claim 1, said ribs being configured so as to extend substantially linearly.

3. The portable handheld tool of claim 1, said support ribs being configured to extend approximately tangentially to said annular-like center portion so as to be resilient in said radial direction.

4. The portable handheld tool of claim 1, each of said support ribs including first and second segments extending one behind the other from said outer surface to said inner wall surface, said first segment extending radially outwardly from said outer surface and said second segment extending away from said first segment in a direction tangent to said outer surface.

5. The portable handheld tool of claim 1, said ribs being mounted on said outer surface so as to be distributed approximately uniformly over said inner surface of said protective tube when in contact therewith.

6. The portable handheld tool of claim 1, said support ribs being in contact with said inner wall surface at respective first locations distributed approximately uniformly over said inner wall surface.

7. The portable handheld tool of claim 6, said impart ribs making impact contact with said inner wall surface at respective second locations distributed approximately uniformly over said inner wall surface.

8. The portable handheld tool of claim 7, said first and second locations being spaced about the periphery of said inner wall surface so as to cause each two mutually adjacent ones of said locations to be separated from each other by the same angular spacing.

9. The portable handheld tool of claim 1, said bearing sleeve unit being made of a heat resistant plastic.

10. The portable handheld tool of claim 1, further comprising a clutch means for transmitting the torque of said motor to said drive shaft; and, said clutch means including: a clutch drum; and, connecting interface means for connecting said drive shaft to said clutch drum; said connecting interface means including an insert portion formed on the end of said drive shaft; a receptacle formed on said clutch drum for receiving said insert portion therein; said insert portion and said receptacle conjointly defining an intermediate space therebetween; and, an insert piece made of elastic material disposed in said intermediate space with said insert portion, said receptacle and said insert piece conjointly defining a positive-engaging coupling.

11. The portable handheld tool of claim 10, said insert portion having a cross section lying within an imaginary circle with said imaginary circle, in turn, lying within said receptacle.

12. The portable handheld tool of claim 10, said insert piece being made of plastic.

13. The portable handheld tool of claim 10, said insert piece being made of polyurethane.

* * * * *